(12) United States Patent
DiMaggio

(10) Patent No.: US 7,886,482 B2
(45) Date of Patent: Feb. 15, 2011

(54) MOBILE GARDEN CART

(76) Inventor: Angela DiMaggio, 2318 E. Huron Ct., Gilbert, AZ (US) 85234-3816

( * ) Notice: Subject to any disclaimer, the term of this patent is extended or adjusted under 35 U.S.C. 154(b) by 0 days.

(21) Appl. No.: 12/386,902

(22) Filed: Apr. 24, 2009

(65) Prior Publication Data

US 2009/0211154 A1     Aug. 27, 2009

Related U.S. Application Data

(63) Continuation-in-part of application No. 12/321,179, filed on Jan. 15, 2009.

(60) Provisional application No. 61/011,812, filed on Jan. 22, 2008.

(51) Int. Cl.
*A47G 7/00* (2006.01)

(52) U.S. Cl. .................... 47/39; 47/82; 47/86
(58) Field of Classification Search ........... 47/82, 47/83, 86; 108/96
See application file for complete search history.

(56) References Cited

U.S. PATENT DOCUMENTS

| | | | | | |
|---|---|---|---|---|---|
| 108,046 | A | * | 10/1870 | Palmenberg | ............... 211/173 |
| 538,145 | A | * | 4/1895 | Allen | ................. 108/1 |
| 584,057 | A | * | 6/1897 | Lemon | .............. 108/92 |
| 875,235 | A | | 12/1907 | Bastel | |
| 1,713,908 | A | * | 5/1929 | Lane | ................. 211/128.1 |
| 1,948,031 | A | * | 2/1934 | Guille | ............... 47/79 |
| 2,579,704 | A | * | 12/1951 | Saul, Jr. | ............ 211/128.1 |
| 2,777,584 | A | * | 1/1957 | Dobrin et al. | ........... 108/148 |
| 2,848,119 | A | * | 8/1958 | Fitser | ............... 108/101 |
| 2,883,064 | A | * | 4/1959 | McKenzie | ............... 108/99 |
| 3,365,840 | A | | 1/1968 | Cooper | |
| 4,109,961 | A | * | 8/1978 | Opsvik | ............... 297/338 |
| 4,255,896 | A | * | 3/1981 | Carl | ................ 47/62 C |
| 4,546,571 | A | * | 10/1985 | Scrivens | ............... 47/81 |
| 4,593,490 | A | * | 6/1986 | Bodine | ............... 47/79 |
| 4,608,776 | A | | 9/1986 | Kooy | |
| 4,896,456 | A | | 1/1990 | Grant | |
| 4,899,487 | A | * | 2/1990 | Brownlee | ............... 47/41.01 |
| 5,022,541 | A | * | 6/1991 | White | ............... 211/186 |
| 5,044,118 | A | | 9/1991 | Ferris | |
| 5,095,649 | A | * | 3/1992 | Brownlee | ............... 47/41.01 |
| 5,095,653 | A | * | 3/1992 | Guldberg | ............... 47/83 |
| 5,367,823 | A | * | 11/1994 | Ferris | ............... 47/39 |
| 5,570,540 | A | * | 11/1996 | Womack et al. | ............... 47/39 |
| D403,268 | S | | 12/1998 | Dignam | |
| 6,402,167 | B1 | | 6/2002 | Calleja | |
| 6,932,363 | B2 | | 8/2005 | D'Angelo | |
| 7,080,482 | B1 | * | 7/2006 | Bradley | ............... 47/60 |
| 2009/0183427 | A1 | * | 7/2009 | DiMaggio | ............... 47/39 |

FOREIGN PATENT DOCUMENTS

| | | | |
|---|---|---|---|
| DE | 3527058 A1 | * | 2/1987 |
| DE | 3835787 A1 | | 4/1990 |
| GB | 2297028 A | * | 7/1996 |
| IE | 81858 B3 | * | 8/2001 |
| WO | WO 2005/042332 A1 | | 5/2005 |

* cited by examiner

*Primary Examiner*—Francis T Palo
(74) *Attorney, Agent, or Firm*—The Halvorson Law Firm

(57) ABSTRACT

A kit for a mobile gardening cart that includes the following: a base structure, form, storage areas, and a plurality of wheels to allow it to pivot in any directions, coupled to a base and an upright frame structure with reasonable braced support, linage/connection to a main vertical frame, and multiple stackable container forms to be placed parallel to each other in an ascending upward fashion.

10 Claims, 12 Drawing Sheets

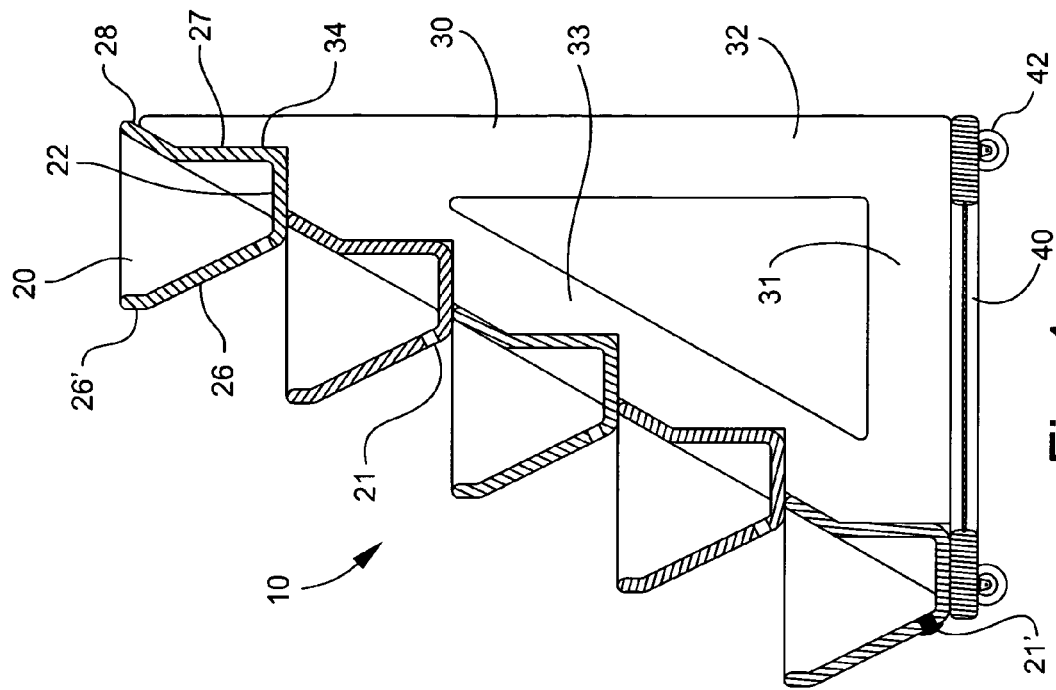
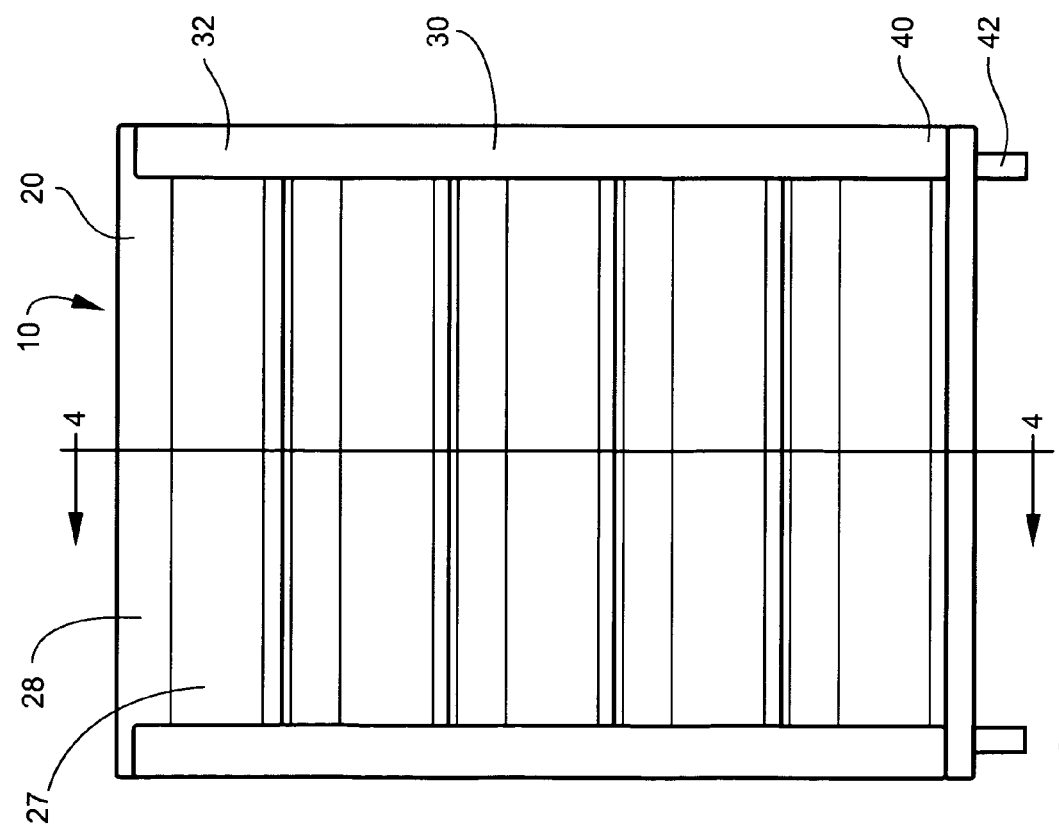

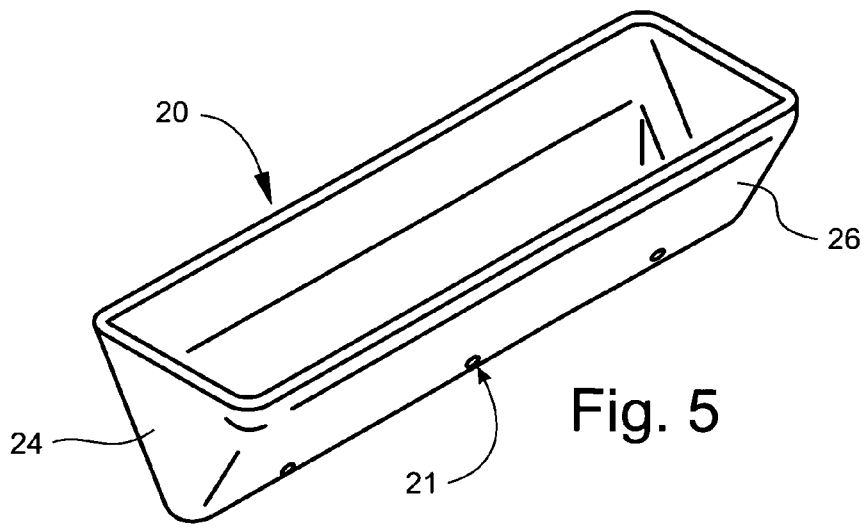
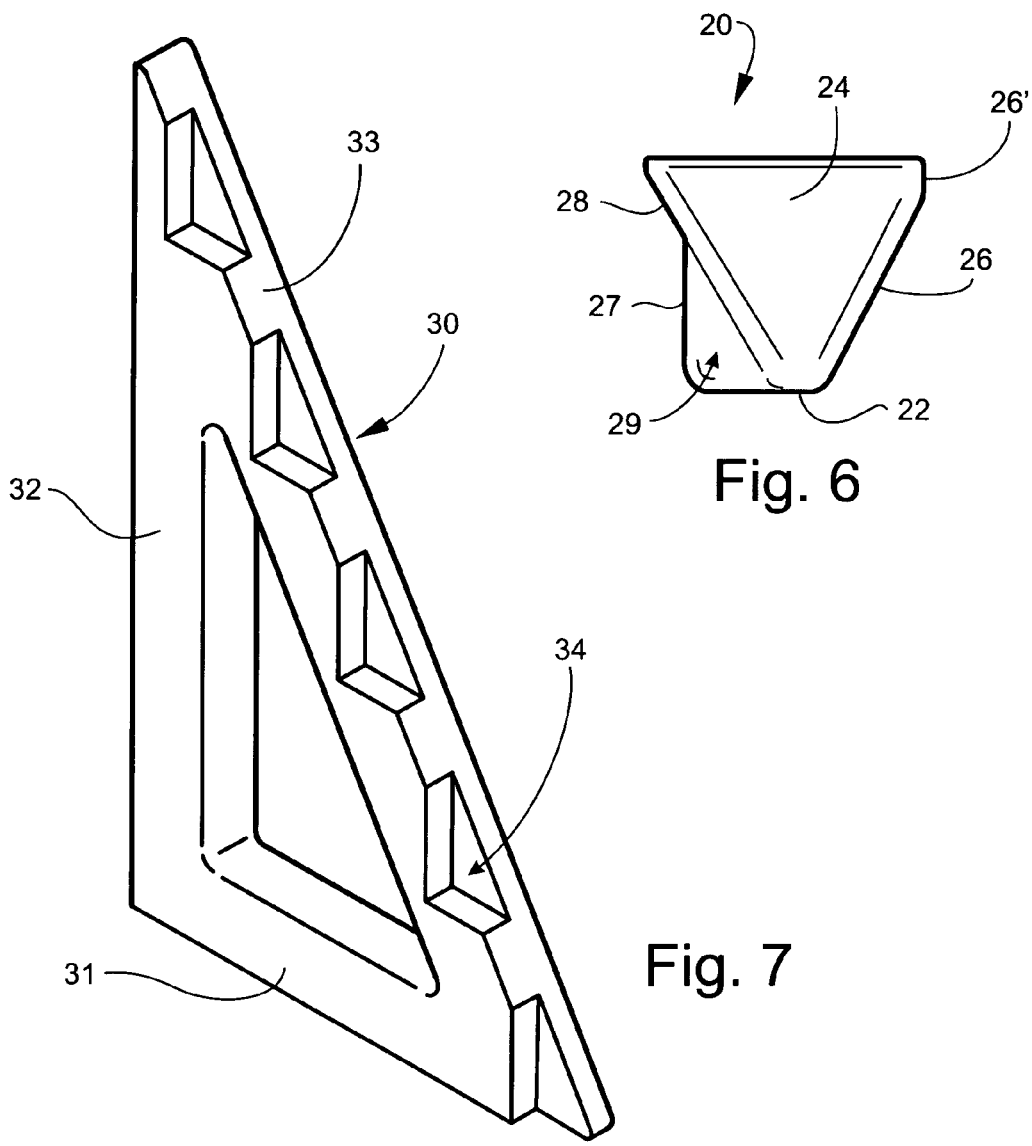

MOBILE GARDEN CART

This application is a continuation in part of U.S. patent application Ser. No. 12/321,179, filed on Jan. 15, 2009, which is a continuation in part of US Provisional patent application 61/011,812 filed on Jan. 22, 2008.

FIELD OF THE INVENTION

The present invention relates to the field of gardening. More specifically, the present invention relates to the filed of mobile garden carts.

BACKGROUND

The present invention relates to gardening carts for the plant or garden hobbyist or horticulturist. An urban gardener frequently is limited in space for plants because of the conventional utilization of living space around the house or apartment. The urban gardener is faced with the choice of dedicating a portion of their living area to the gardening effort and loss of utility of the area or the pursuit of the hobby in full view of visitors. While the trappings of the gardener produce the beauty and joy of mature fruit and flowers, the present invention provides an attractive gardening area that is mobile and will complement the decor of the living space.

Moreover, the present invention provides both a decorative and attractive aspect to the gardening function. With the disclosed gardening cart, the structure may be readily assembled and utilized for the period necessary. The gardening cart may then be easily transported to another location. While the structure is functional and sturdy, the simplistic design and assembly provides an attractive help-mate to the gardener.

Further application of the present invention may be found in the portability of the gardening cart as used for early planting of vegetable seedlings. In such application, the seedling house may be set out of doors during the warmer, sunny days to encourage the germination and growth of the seeds. The cart is then readily returned indoors for the cool evenings or colder, dark days which could inhibit plant growth.

SUMMARY OF THE INVENTION

It is an object of the present invention to provide a kit and device for mobile gardening comprising a base structure, at least one vertical support attached to rear end of the base structure, at least one diagonal support attached between a front end of the base structure and a top end of the vertical support, said diagonal support further comprising a plurality of bracket receiving slots; at least two growing containers, each growing container comprising at least a base and at least on side, capable of holding soil or other plant material, said base have at least one water drainage aperture; and at least two bracket attaching the at least two growing containers to the diagonal supports of the cart.

It is another object of the present invention to provide the kit and device for mobile gardening wherein the at least two growing containers are all the same size.

It is yet another object of the present invention to provide the kit and device for mobile gardening wherein the at least two growing containers are different sizes.

It is still yet another object of the present invention to provide a kit and device for mobile gardening that easily and conveniently fits in corner areas.

It is a further object of the present invention to provide a kit and device for mobile gardening that includes an easy watering feature.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

BRIEF DESCRIPTION OF THE DRAWINGS

FIG. 3 shows a rear view of the second embodiment of the present invention.

FIG. 4 shows a sectional view, along line 4-4, of the second embodiment of the present invention.

FIG. 5 shows a perspective view of a planter according to the present invention.

FIG. 6 shows a side view of the planter according to the present invention.

FIG. 7 shows a perspective view of a chassis support member with precut planter attachment slots.

Figure 1:
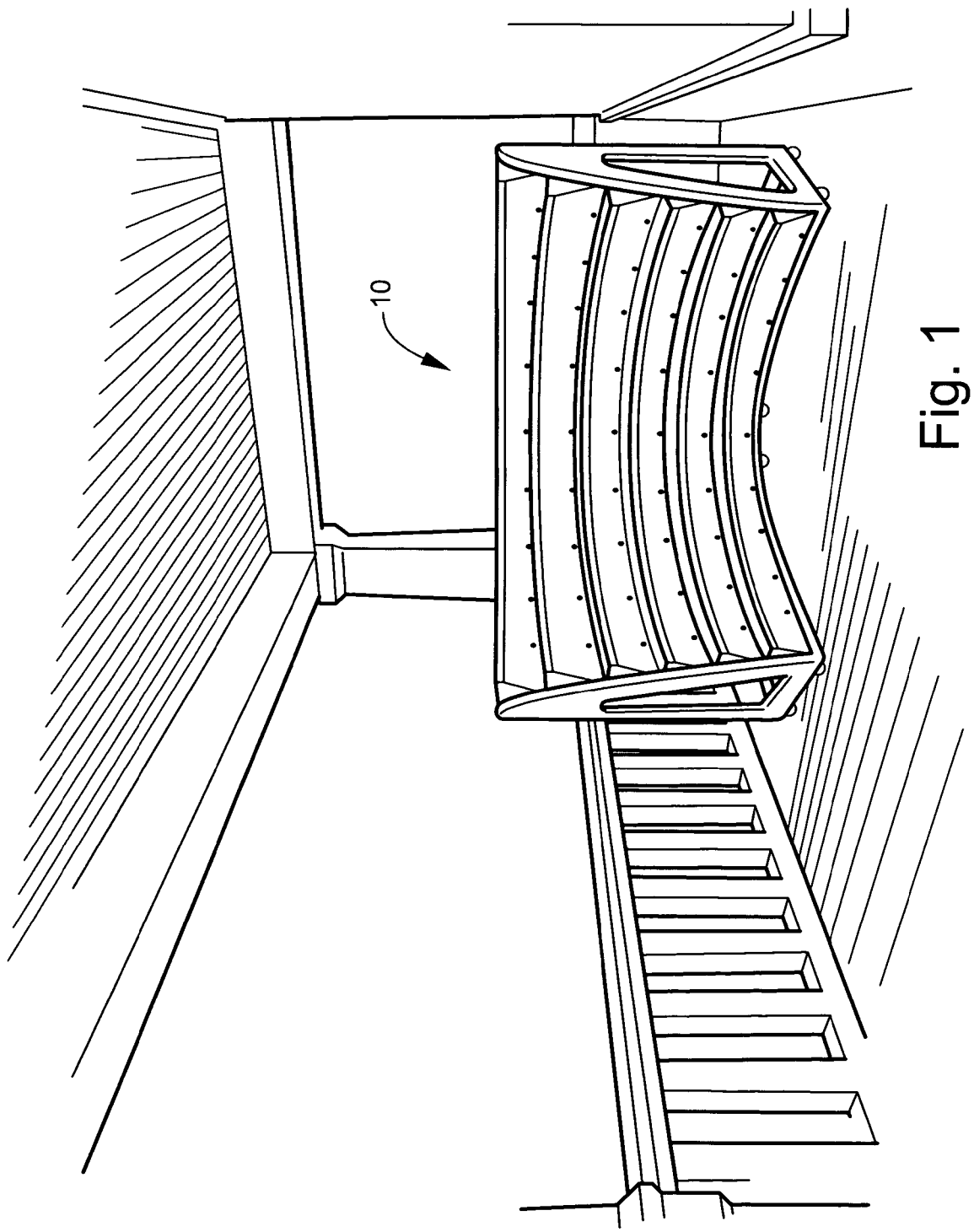
FIG. 1 shows a perspective view of one embodiment of the present invention.

Reference now will be made in detail to various aspects of this invention, including the presently preferred embodiments. Each example is provided by way of explanation of embodiments of the invention, not limitation of the invention. In fact, it will be apparent to those skilled in the art that various modifications and variations can be made in the present invention without departing from the spirit or scope of the invention. For instance, features illustrated or described as part of one embodiment can be used on another embodiment to yield a still further embodiment. Thus, it is intended that the present invention cover such modifications and variations within the scope of the appended claims and their equivalents.

DETAILED DESCRIPTION

The present invention is useful for home gardening. Specifically, it is mobile garden cart that is useful in that it allows relocation of home patio gardens as the user desires.

FIGS. 1 to 23 show exemplary mobile garden carts 10 that are suitable for use as an upright terraced growing container system, and their components thereof.

The cart 10 according to the present invention comprises a series of planters, or growing containers 20. These growing containers 20 are preferably attached in a tiered fashion to at least one, preferably two or more supports 30. The cart 10 of the present invention includes at least two growing containers 20, though preferably there are three or more growing containers 20. Preferably the growing containers 20 are symmetrically attached to the supports 30, but asymmetrical attachment is also considered. Critically, at least a portion of each growing container 20 is directly over the growing container adjacent below (with the exception of the bottom growing container). Thus, the supports 30 must allow the tiered growing containers 20 to be attached in a substantially diagonal configuration, though an arcuate or other configurations are also considered.

Each growing container 20 is capable of holding soil or other plant base matter. One preferred embodiment of growing container 20 has a base 22 with two vertical ends 24 and two non-vertical, outwardly angled sides attached thereto. In a preferred alternate embodiment, there is a base 22, two vertical ends 24, an angled non-vertical front 26, a vertical rear 27, thereby defining an open topped container. In a preferred embodiment, there is also a non-vertical, outwardly angled lip 28 attached to the rear 27. In a most preferred embodiment, there is a second set of vertical ends 29 inset from the first set of vertical ends 24 attached to the base 22 and rear 27 (see specifically FIG. 6), thereby defining an inset in the back of the growing container 20 which is useful for attachment to preferred supports 30. Further, a vertical lip 26' may be included by attachment to an upper side of the non-vertical front 26, for functional or aesthetic reasons.

In one embodiment, the growing containers 20 are sized to be stacked inside of each other when shipped in the disassembled state. Critically, each growing container 20 further comprises at least one drainage aperture 21. These drainage apertures should be located that when water flows through them, the water is received by the growing container below (with the exception of the bottom growing container), thereby reducing water wastage. In one embodiment, not shown, the drainage apertures 21 are located in the base of the growing containers 20, in a more preferred embodiment, illustrated in the figures, the drainage apertures 21 are located in the non-vertical front 26 adjacent to the bottom 22 of the growing containers 20. In order to regulate water flow from these growing containers 20, the present invention also includes at least one drainage aperture plug 21', preferable a multitude of plugs 21'.

The growing containers 20 may be sectionable by means of at least one partition, not shown, that may be inserted into the interior of the growing containers 20.

The supports 30 of the present invention are preferably generally triangular in shape, each having a horizontal leg 31, a vertical let 32 any a hypotenuse leg 33. Located in each hypotenuse leg 33 are at least one, preferably two or more support notches 34. Each support notch 34 is sized to the bottom 22 and vertical rear 27 of the growing containers 20. The support notches 34, preferably, do not extend through the width of the hypotenuse leg 33 in order for the proximal and distal ends of the growing container 20 to extend over a portion of the hypotenuse leg 33 thereby providing stability and aesthetic considerations. However, it is considered that the support notches 34 may extend through the width of the hypotenuse leg 33 and still fall within the scope of the present invention.

One preferred base structure 40 is rectangular and four sides, two short sides and two long sides. Another preferred base structure 40 is trapezoidal with four sides, two angles sides, a short side and a long side. Other shapes may be used and still fall within the scope of the present invention. The inside area of the base structure 40 is preferably spanned by a tray, netting or mesh.

The base structure 40 is movable comprising at least one movement enabling structure 42. In one preferred embodiment the movement enabling structure 42 comprises four castered wheels. In another preferred embodiment, the movement enabling structure 42 comprises three castered wheels. In an alternate embodiment, the movement enabling structure 42 comprises four low friction slide pads. Other movement enabling structures may be uses and still fall within the scope of the present invention.

FIG. 1 illustrates one preferred embodiment of the present invention wherein the growing containers 20 are curved or arcuate. In this figure, the curve covers 90° of arc, however other curve coverages, such as 45° and 180°, are considered to fall within the scope of the present invention.

Figure 2:
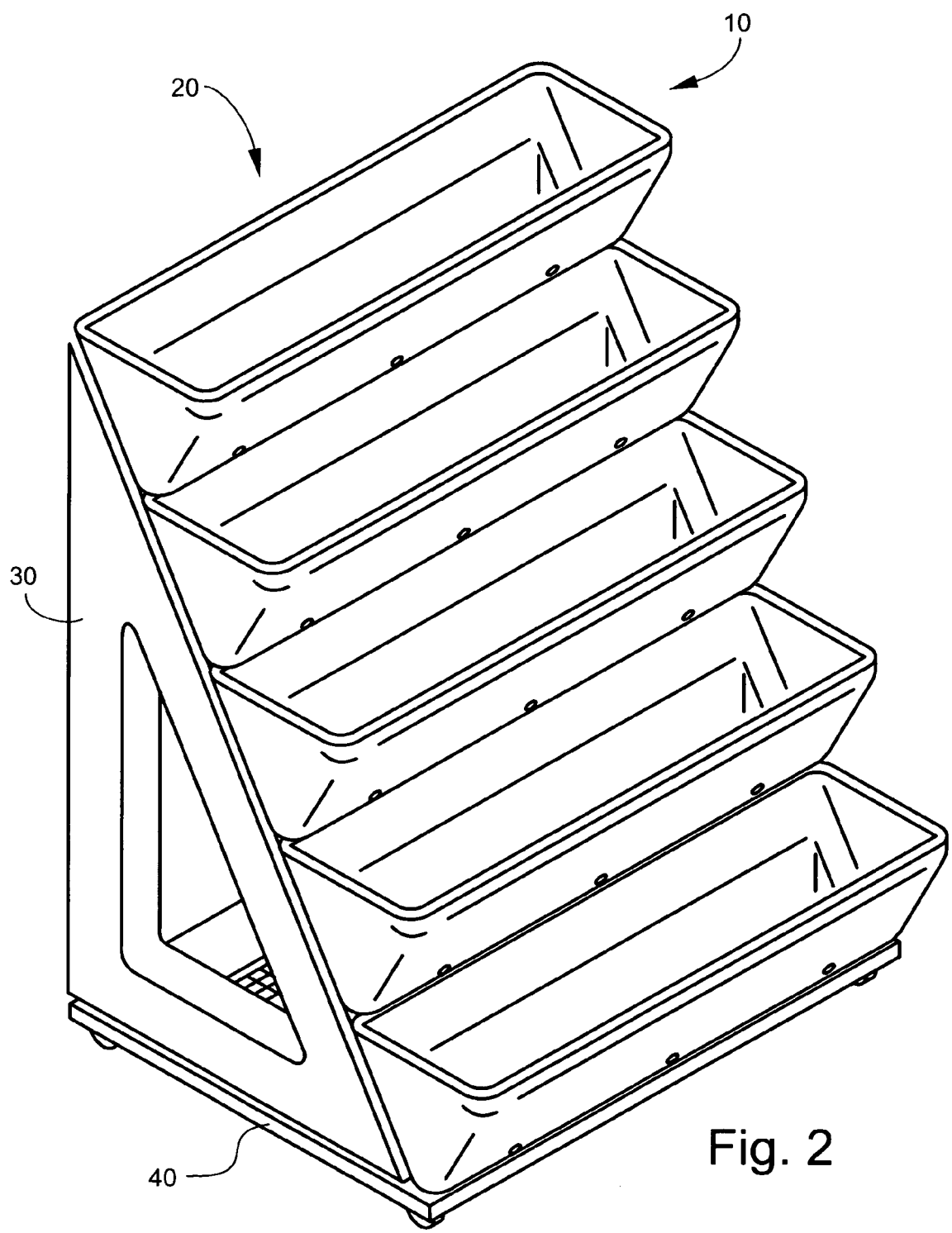
FIG. 2 shows a perspective view of a second embodiment of the present invention.
Figure 8:
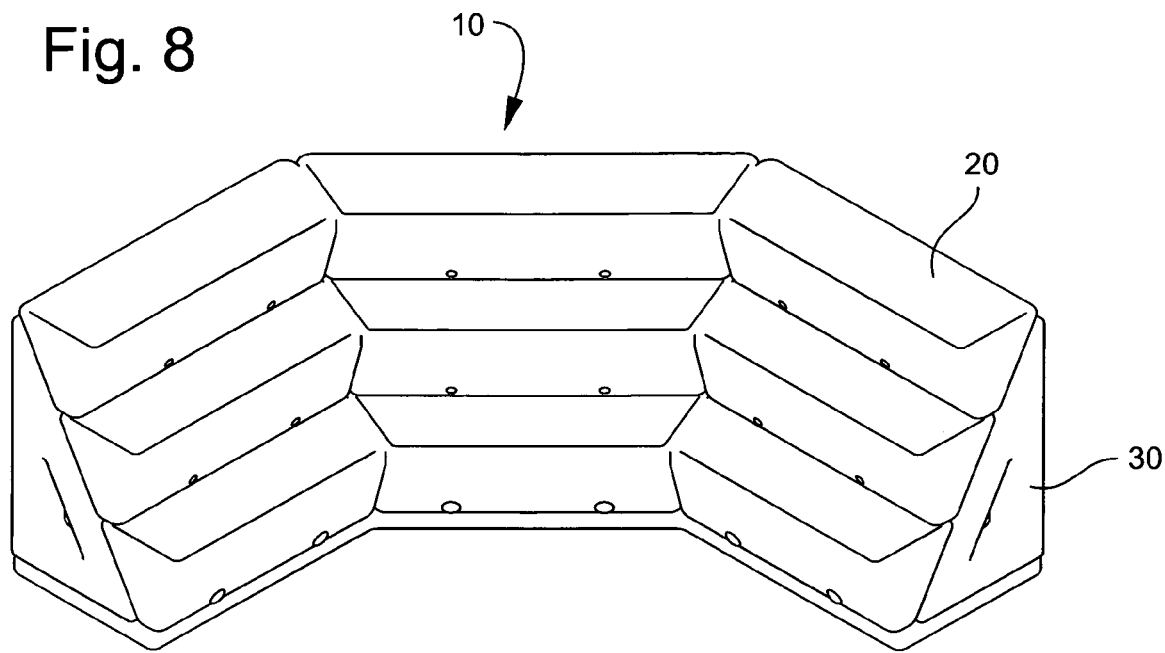
FIG. 8 shows a perspective view of third embodiment of the present invention.

FIG. 2 illustrates an alternate embodiment of the present invention wherein the growing containers 20 are generally straight.

FIGS. 8-11 illustrate yet another alternate embodiment of the present invention wherein more than one, preferably three, straight carts 10, such as illustrated in FIG. 2, may be attached together to form a truncated V shaped assembly. When combining several carts in to a complex assembly, there may be attachment clips or the like that hold the several carts together. These clips may act on either adjacent growing containers, adjacent supports, or adjacent base units and still fall within the scope of the present invention.

FIGS. 12-15 illustrate still yet another alternate embodiment of the present invention wherein two straight carts 10 are joined to form a V-shaped assembly.

FIGS. 16-19 further illustrates the embodiment first shown in FIG. 1 wherein growing containers are curved to form an arcuate shaped assembly.

FIGS. 20-23 illustrates still a further alternate embodiment where the supports 30 are angled relative to the growing containers 20 to allow the entire assembly to more easily fit within a corner area. In this version, the base 40 of the cart 10 is preferably more trapezoidal in shape.

Figure 9:
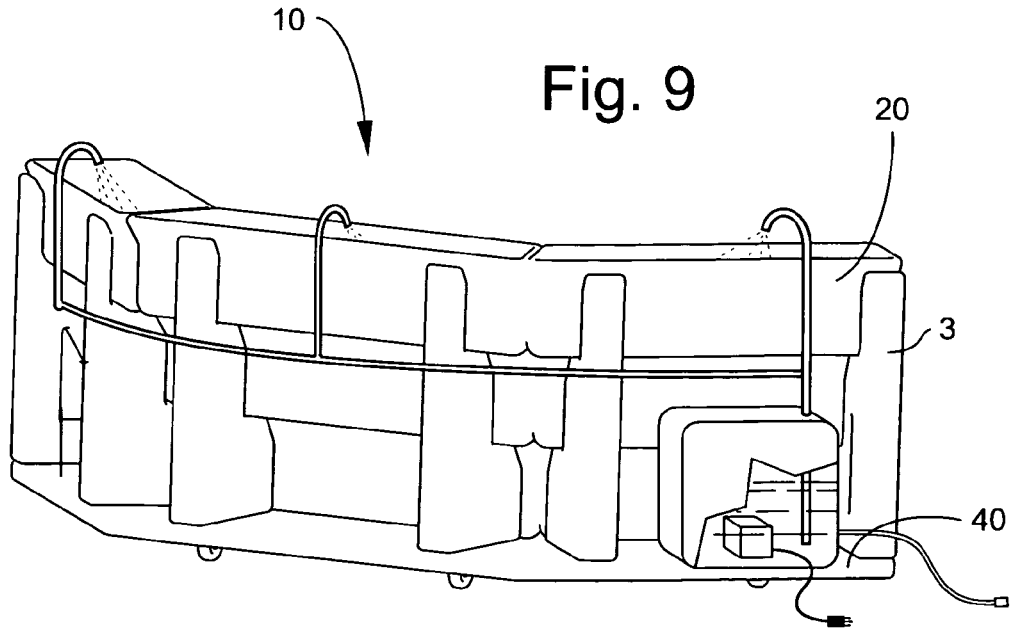
FIG. 9 shows a rear perspective view of the third embodiment of the present invention.
Figure 10:
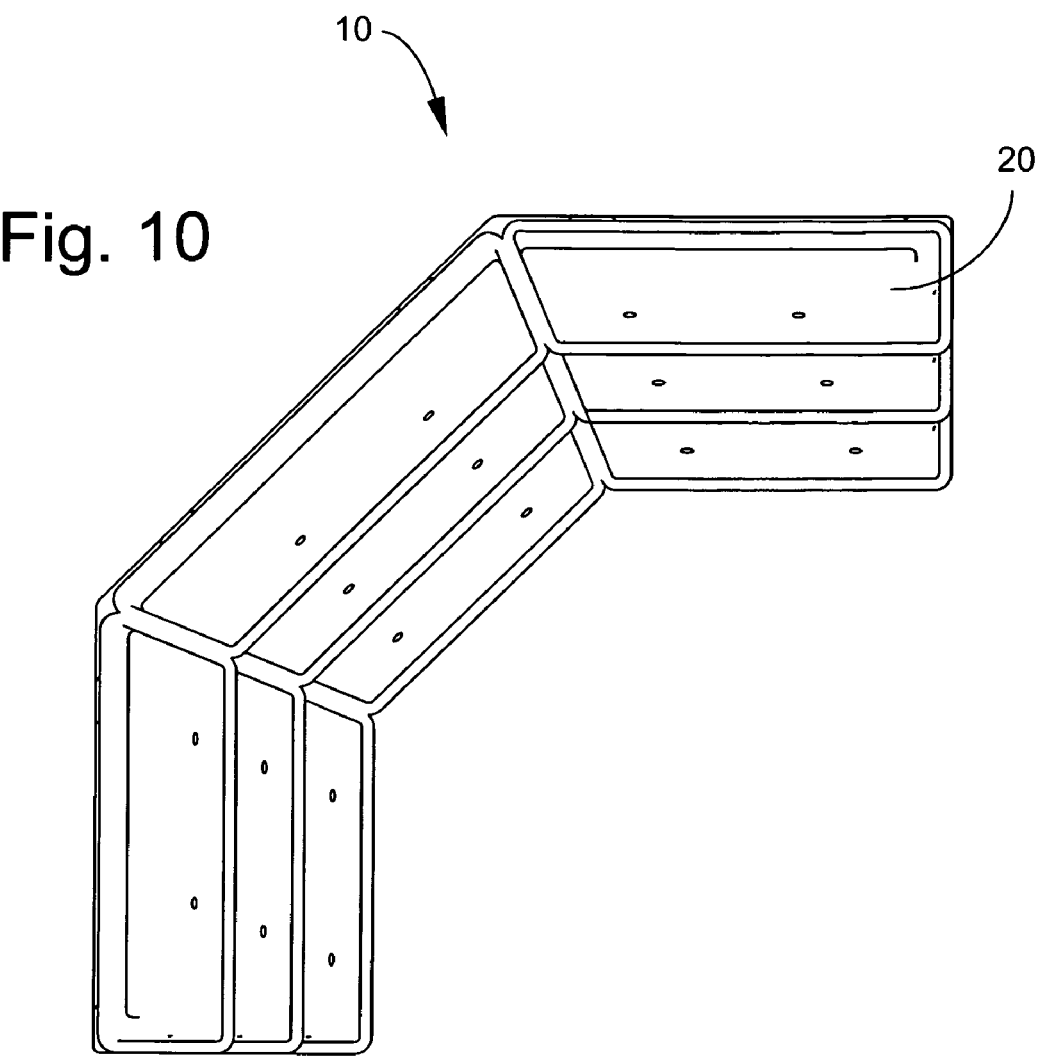
FIG. 10 shows a top view of the third embodiment of the present invention.
Figure 11:
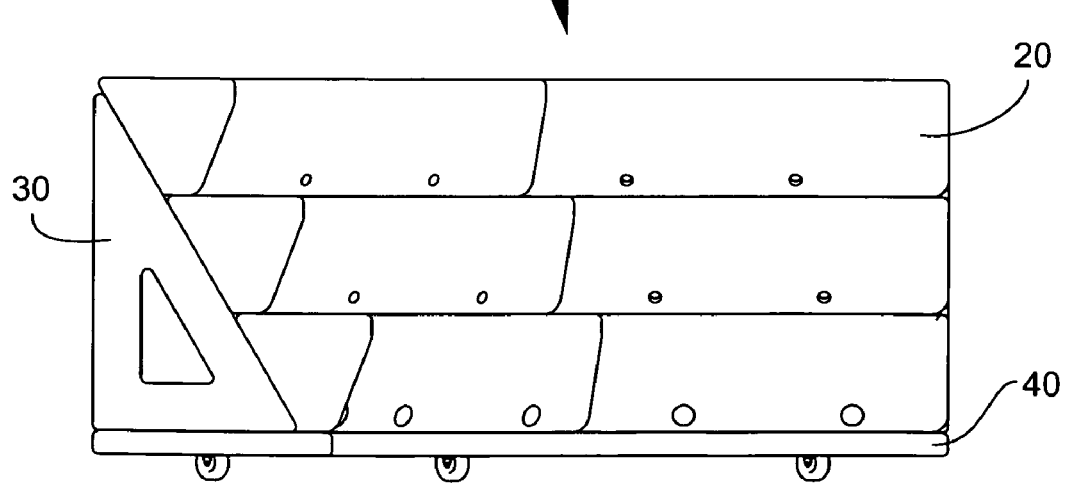
FIG. 11 shows a side view of the third embodiment of the present invention.
Figure 12:
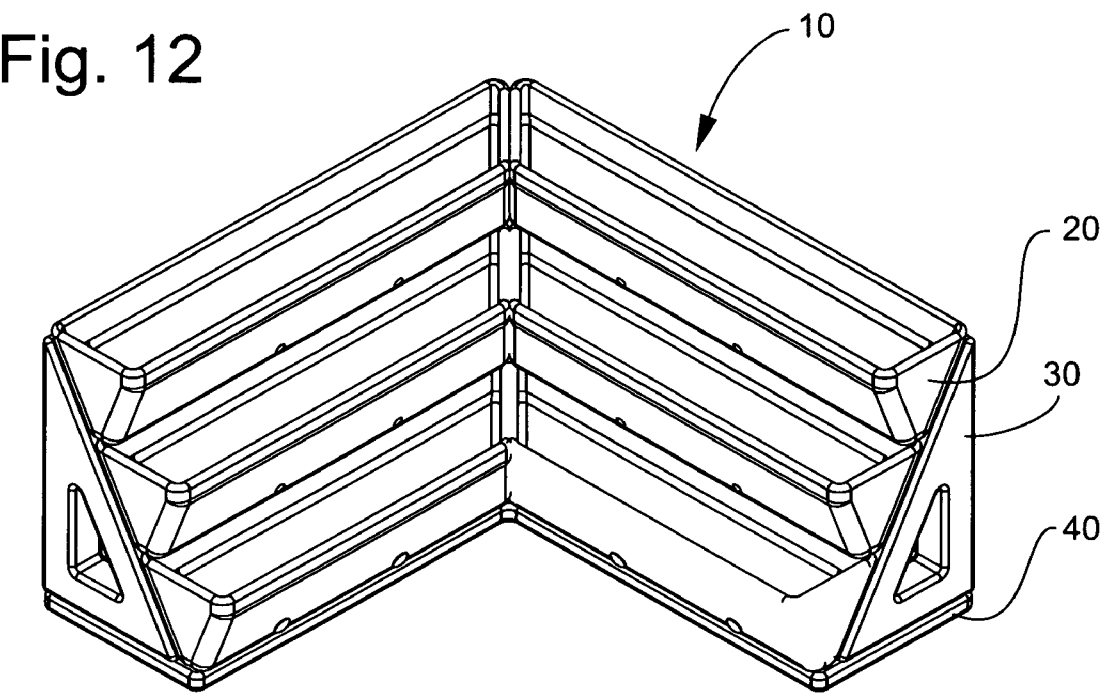
FIG. 12 shows a perspective view of fourth embodiment of the present invention.
Figure 13:
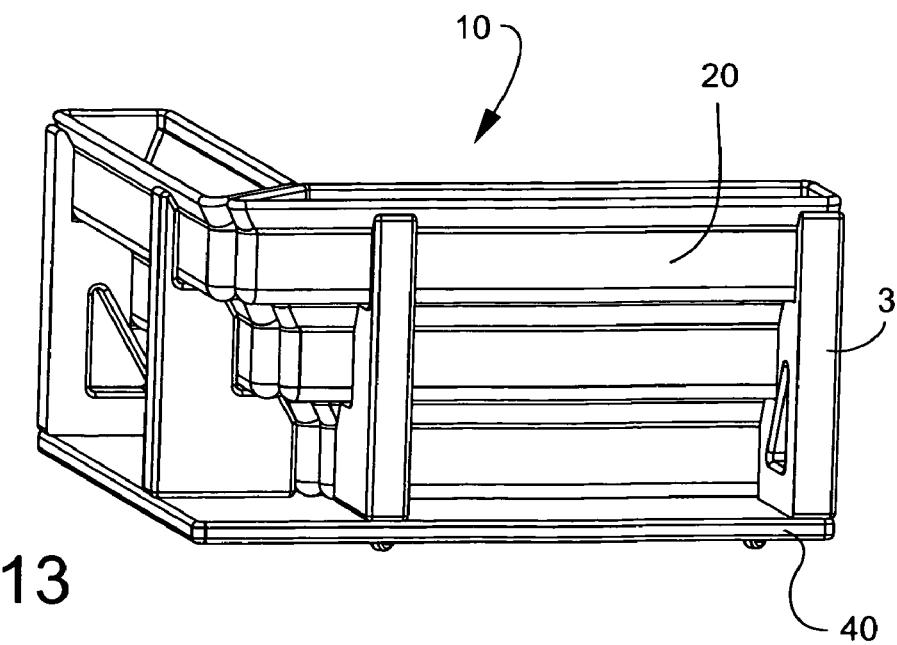
FIG. 13 shows a rear perspective view of the fourth embodiment of the present invention.
Figure 14:
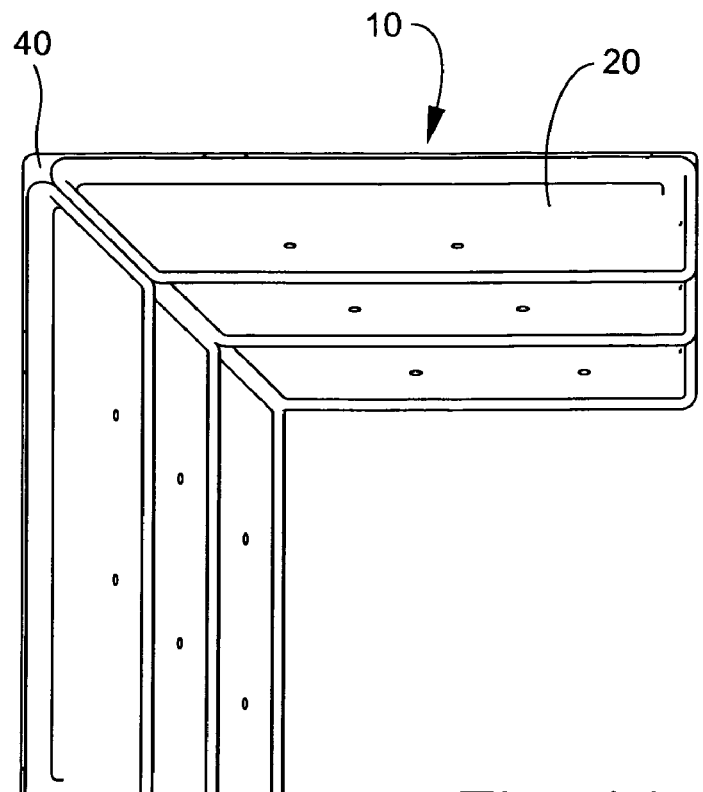
FIG. 14 shows a top view of the fourth embodiment of the present invention.
Figure 15:
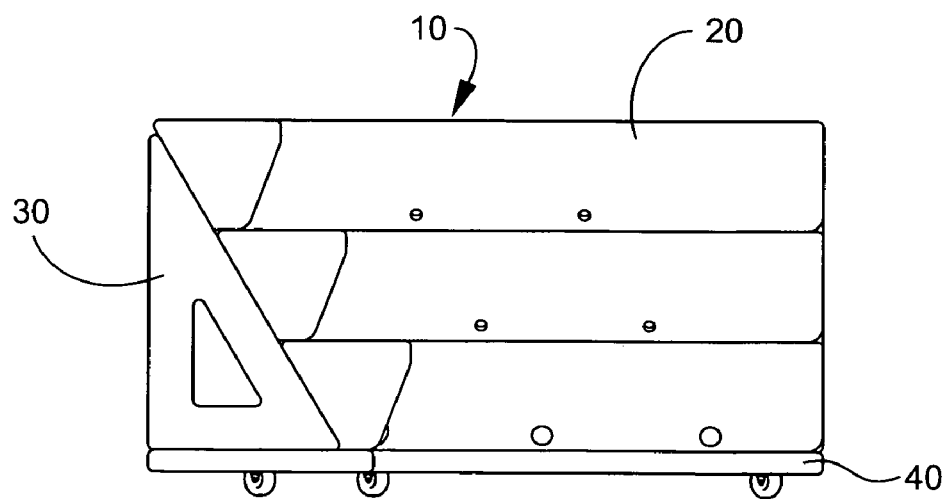
FIG. 15 shows a side view of the fourth embodiment of the present invention.
Figure 16:
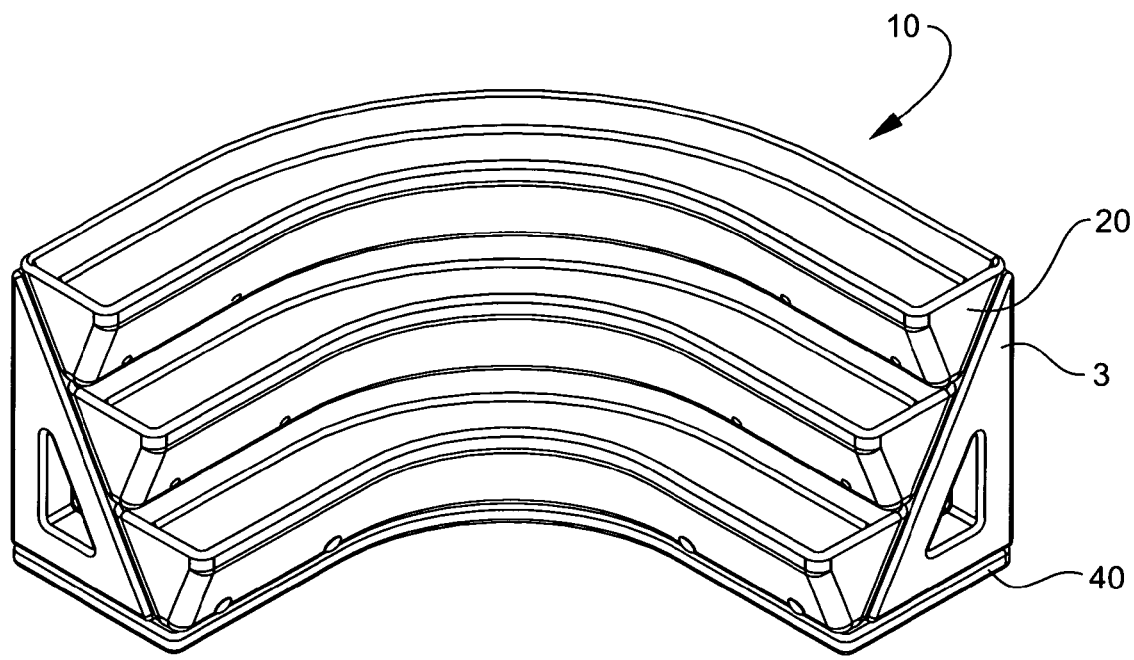
FIG. 16 shows a perspective view of fifth embodiment of the present invention.
Figure 17:
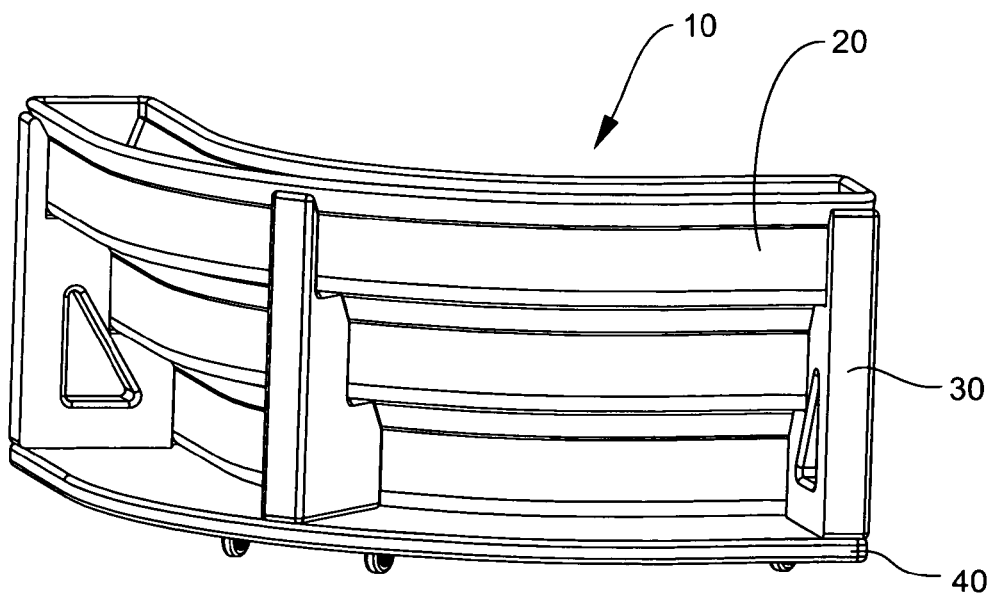
FIG. 17 shows a rear perspective view of the fifth embodiment of the present invention.
Figure 18:
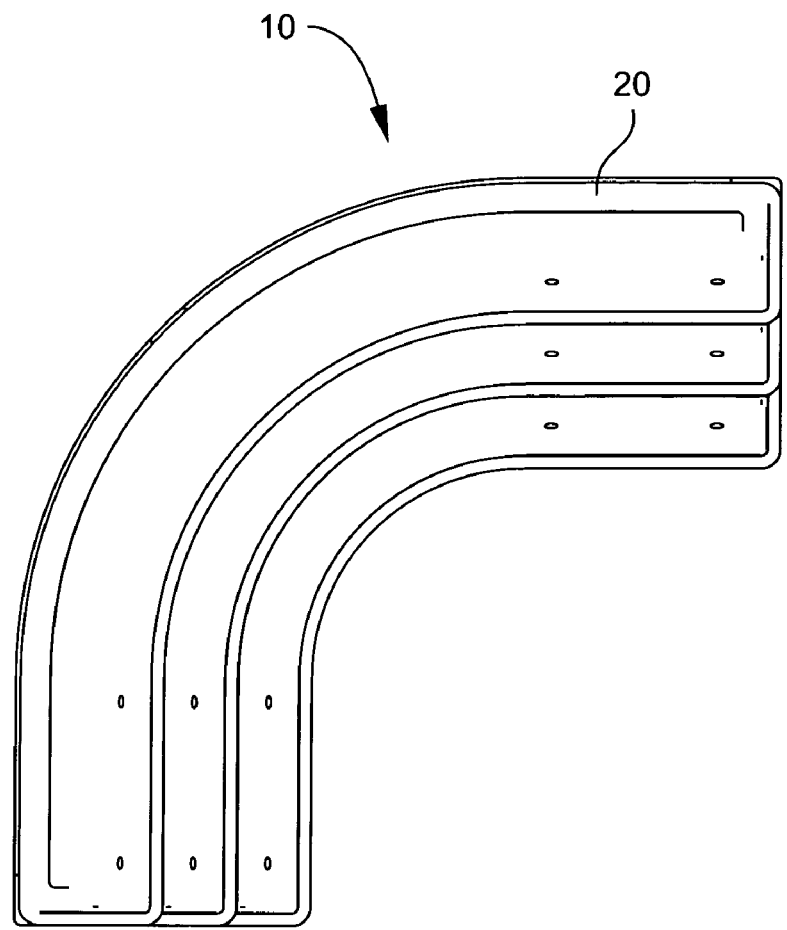
FIG. 18 shows a top view of the fifth embodiment of the present invention.
Figure 19:
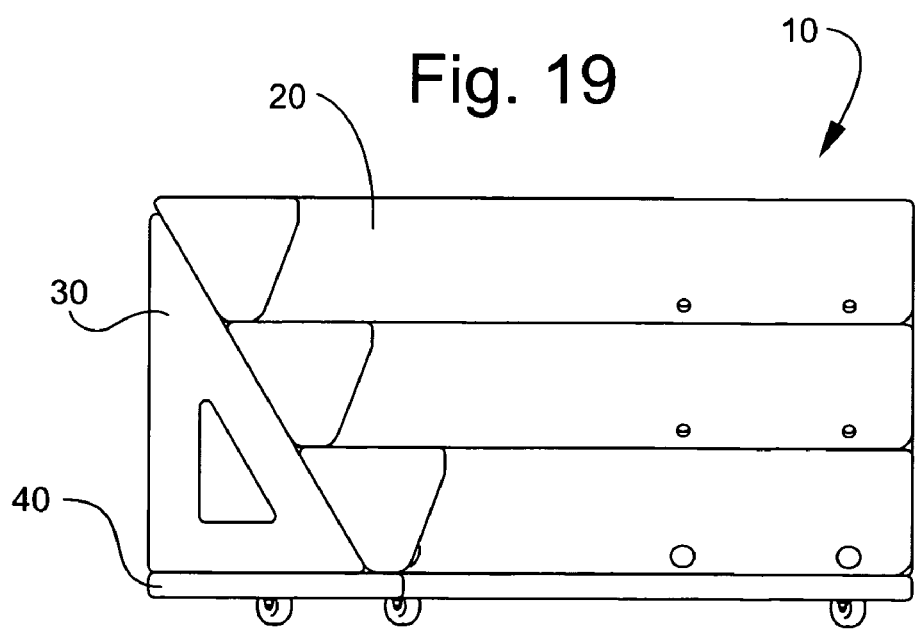
FIG. 19 shows a side view of the fifth embodiment of the present invention.
Figure 20:
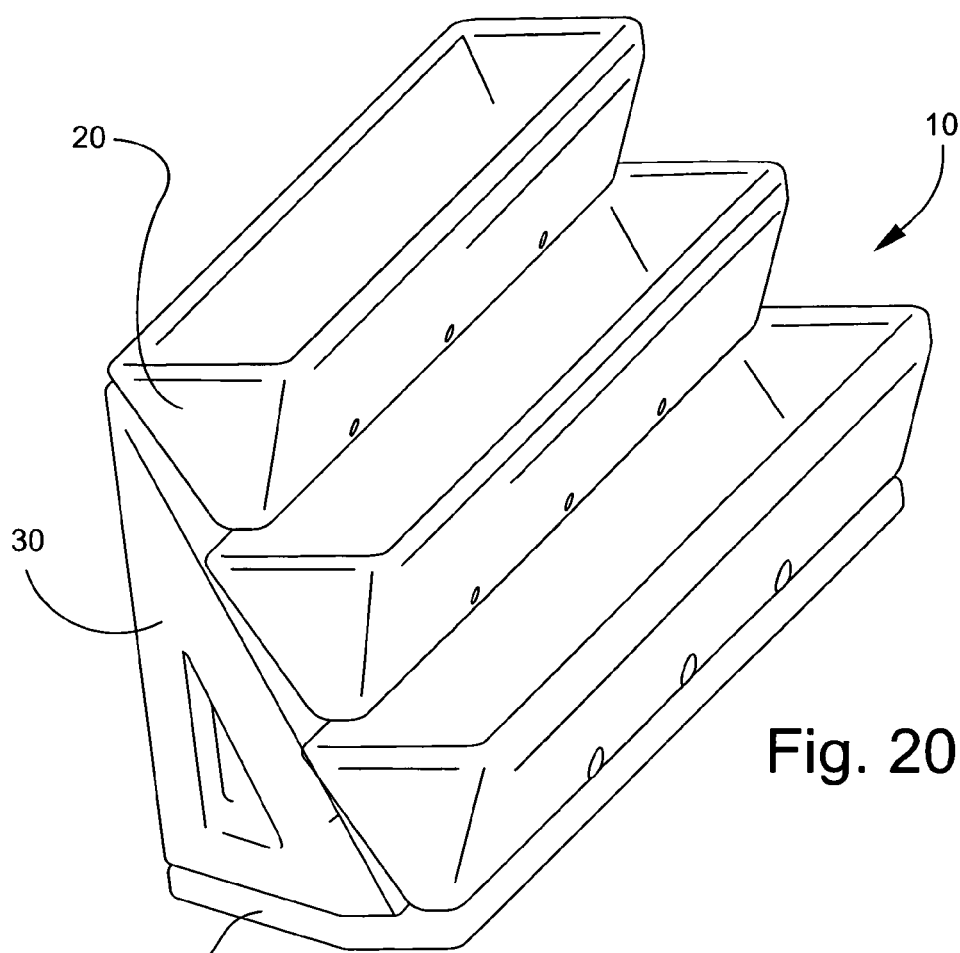
FIG. 20 shows a perspective view of sixth embodiment of the present invention.
Figure 21:
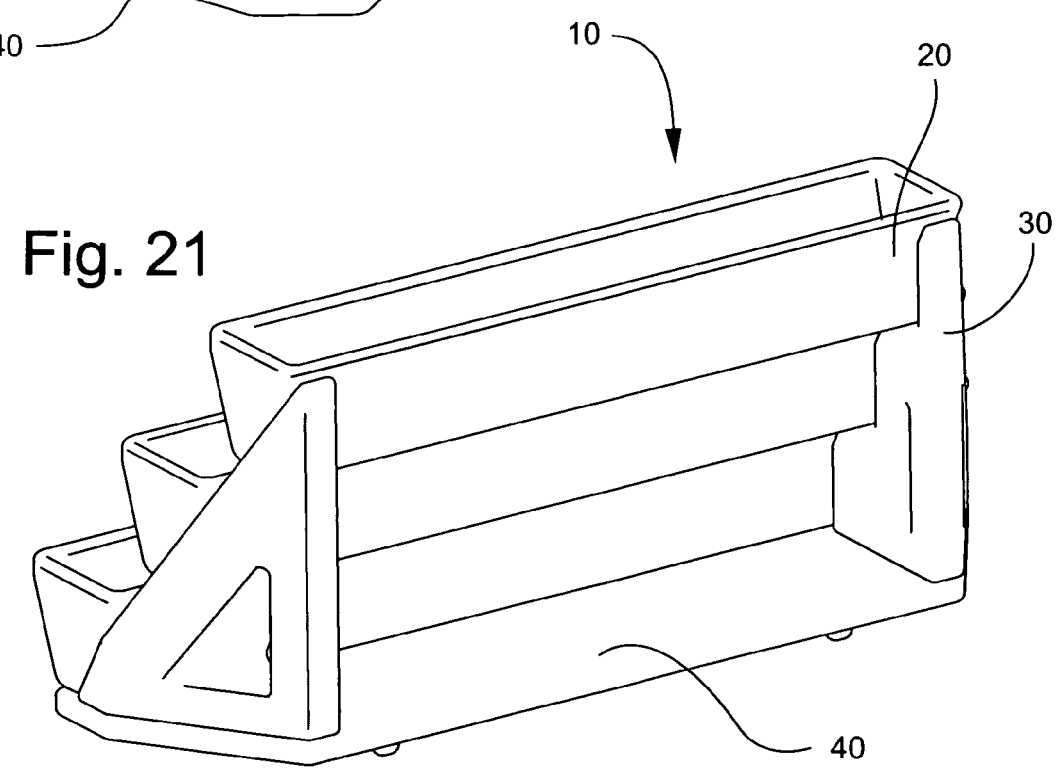
FIG. 21 shows a rear perspective view of the sixth embodiment of the present invention.
Figure 22:
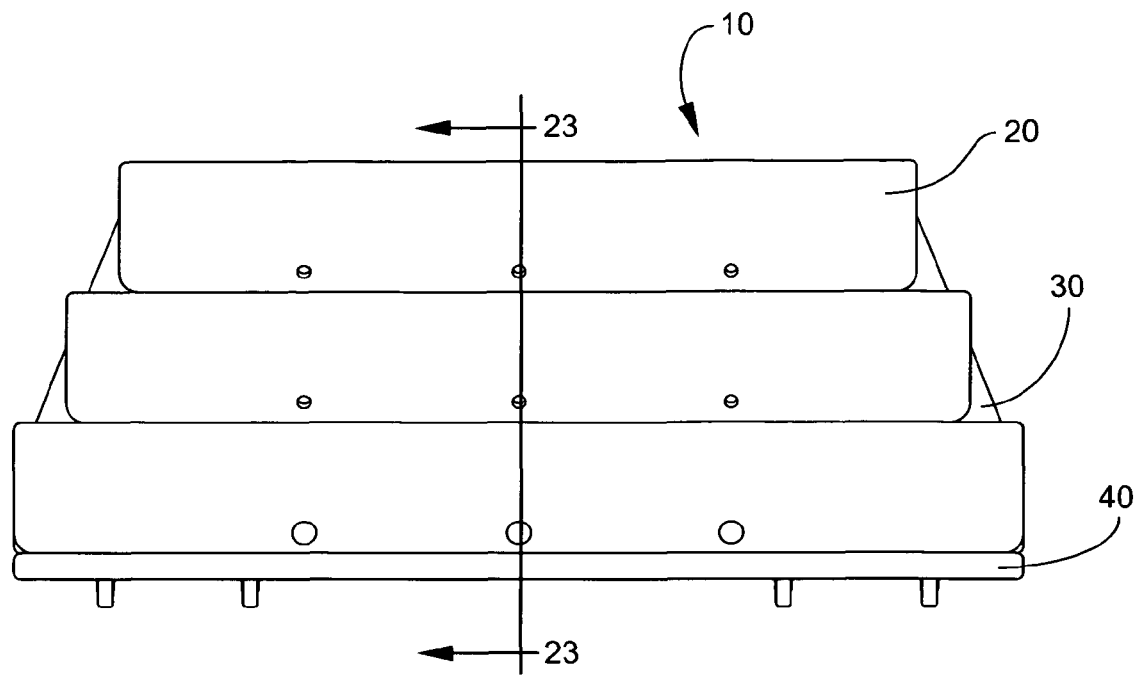
FIG. 22 shows a top view of the sixth embodiment of the present invention.
Figures 23, 24:
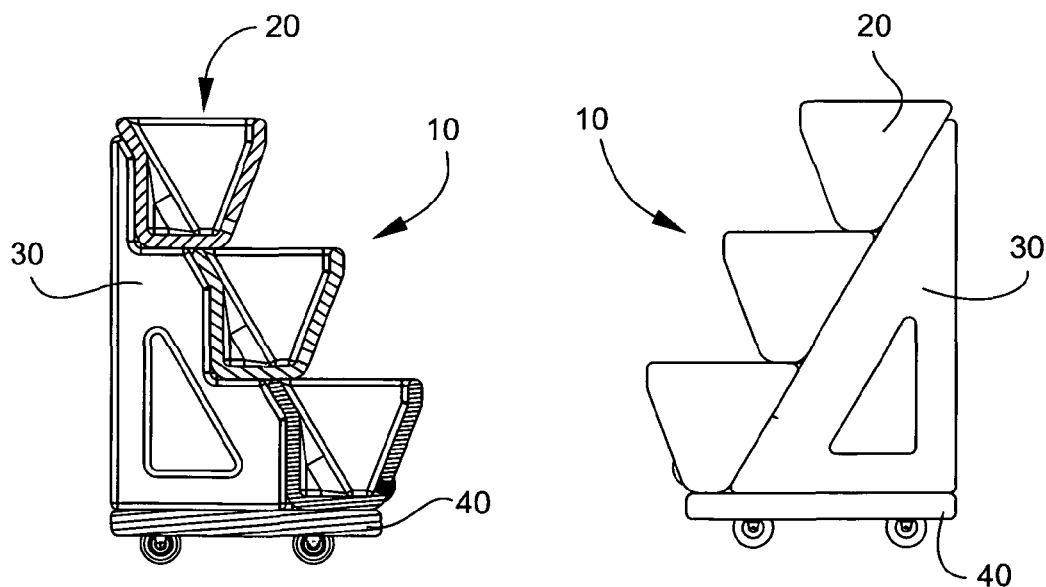
FIG. 23 shows a cut-away side view of the sixth embodiment of the present invention.
FIG. 24 shows a side view of the sixth embodiment of the present invention

Finally, FIG. 9 illustrates an embodiment of the present invention that includes a watering system. In one form the watering system is a simple mist or drip system hooked up directly to a hose, thereby allowing for distributed watering. In another embodiment the watering system further includes a water storage tank that is in fluid communication with a water hose, a water metering mechanism such as a float for filling the storage container and a pump for distributing the water and a tree of hoses for fluid distribution of the water from the pump. The ends of the hoses may be either drip or mist distributors. Other watering systems may be used and still considered to fall within the scope of the present invention, such as a horizontal PVC or plastic tube on one side or in the middle of each growing container. Finally there may be a series of apertures in the angled rear lip of each growing container to contain a drip nozzle, thereby hiding from general view the bulk of the watering system.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A kit for gardening comprising a wheeled cart comprising a base structure, at least one diagonal support, said diagonal support further comprising a plurality of notches for attaching the at least two growing containers to the diagonal supports of the wheeled cart; at least two growing containers capable of holding soil or other plant material, said growing containers comprising a base, two sides, a forward angled front side having a vertical lip, a rear vertical side and a rearwardly angled rear lip and having at least one drainage aperture in either the base or the forward angled front.

2. The kit according claim 1 wherein the at least two growing containers are all the same size.

3. The kit according to claim 1 wherein the at least two growing containers are different sizes.

4. The kit according to claim 1 further including at least one drainage aperture plug.

5. The kit according to claim 1 wherein the support comprises a horizontal leg, a vertical leg and a hypotenuse leg.

6. A device for gardening comprising a wheeled cart comprising a base structure, at least one diagonal support attached to the base structure, said support further comprising a plurality of growing container receiving notches; at least two growing containers, each growing container comprising a base, two sides, a forward angled front side having a vertical lip, and a vertical rear side having an angled rear lip, capable of holding soil or other plant material, said growing containers have at least one water drainage aperture located in the front side adjacent to the base; attached to the at least one support.

7. The kit according claim 6 wherein the at least two growing containers are all the same size.

8. The kit according to claim 6 wherein the at least two growing containers are different sizes.

9. The kit according to claim 6 further including at least one drainage aperture plug.

10. The kit according to claim 6 wherein the support comprises a horizontal leg, a vertical leg and a hypotenuse leg.

* * * * *